United States Patent
Hu (10) Patent No.: US 10,564,651 B2
(45) Date of Patent: Feb. 18, 2020

(54) CONTROL SYSTEM, TERMINAL AND AIRBORNE FLIGHT CONTROL SYSTEM OF MULTI-ROTOR CRAFT

(71) Applicant: GUANGZHOU EHANG INTELLIGENT TECHNOLOGY CO., LTD., Guangzhou, Guangdong (CN)

(72) Inventor: Huazhi Hu, Guangdong (CN)

(73) Assignee: GUANGZHOU EHANG INTELLIGENT TECHNOLOGY CO., LTD., Guangzhou (CN)

( * ) Notice: Subject to any disclaimer, the term of this patent is extended or adjusted under 35 U.S.C. 154(b) by 193 days.

(21) Appl. No.: 15/555,520

(22) PCT Filed: Apr. 9, 2015

(86) PCT No.: PCT/CN2015/076137
§ 371 (c)(1),
(2) Date: Sep. 4, 2017

(87) PCT Pub. No.: WO2016/138687
PCT Pub. Date: Sep. 9, 2016

(65) Prior Publication Data
US 2018/0046203 A1    Feb. 15, 2018

(30) Foreign Application Priority Data
Mar. 3, 2015  (CN) .......................... 2015 1 0094841

(51) Int. Cl.
G05D 1/10 (2006.01)
B64C 39/02 (2006.01)

(52) U.S. Cl.
CPC ........... *G05D 1/102* (2013.01); *B64C 39/024* (2013.01); *B64C 2201/108* (2013.01);
(Continued)

(58) Field of Classification Search
CPC ............ B64C 39/024; B64C 2201/108; B64C 2201/12714; B64C 2201/146; G05D 1/102
See application file for complete search history.

(56) References Cited

U.S. PATENT DOCUMENTS

| 9,678,507 B1 * | 6/2017 | Douglas ................. G08G 5/003 |
| 2010/0168949 A1 * | 7/2010 | Malecki ............... G05D 1/0676 701/24 |

(Continued)

FOREIGN PATENT DOCUMENTS

| CN | 202111870 U | 1/2012 |
| CN | 202838028 U | 3/2013 |

(Continued)

OTHER PUBLICATIONS

English translation for the refernece CN103365298 (Year: 2013).*
(Continued)

*Primary Examiner* — Rachid Bendidi (57) ABSTRACT

A control system includes an airborne flight control system and a smart terminal; the airborne flight control system is configured to acquire a first position information, and send the first position information to the smart terminal; the smart terminal is configured to acquire a second position information, and obtain a yaw angle and at least one of a horizontal flight speed and a vertical flight speed according to the second position information and the first position information sent by the airborne flight control system, and send the yaw angle and at least one of the horizontal flight speed and the vertical flight speed to the airborne flight control system, wherein the first position information is the position information of an aircraft where the airborne flight control system is located, and the second position information is the position information of the smart terminal.

18 Claims, 6 Drawing Sheets

(52) U.S. Cl.
CPC .... *B64C 2201/127* (2013.01); *B64C 2201/14* (2013.01); *B64C 2201/146* (2013.01)

(56) References Cited

U.S. PATENT DOCUMENTS

| | | | | |
|---|---|---|---|---|
| 2013/0079954 A1* | 3/2013 | Malecki | ............... | G05D 1/0676 701/2 |
| 2015/0057844 A1* | 2/2015 | Callou | ................. | G05D 1/0204 701/3 |

FOREIGN PATENT DOCUMENTS

| | | | |
|---|---|---|---|
| CN | 103365298 A | * | 10/2013 |
| CN | 103365298 A | | 10/2013 |
| CN | 104133484 A | | 11/2014 |
| CN | 104155981 A | | 11/2014 |

OTHER PUBLICATIONS

International Search Report of PCT Patent Application No. PCT/CN2015/076137 dated Nov. 18, 2015.
1st Office Action of counterpart Chinese Patent Application No. 201510094841.8 dated Dec. 8, 2015.
2nd Office Action of counterpart Chinese Patent Application No. 201510094841.8 dated Apr. 12, 2016.

\* cited by examiner

CONTROL SYSTEM, TERMINAL AND AIRBORNE FLIGHT CONTROL SYSTEM OF MULTI-ROTOR CRAFT

FIELD

The invention relates to aircraft control, particularly involving a control system, a terminal and an airborne flight control system of a multi-rotor aircraft.

BACKGROUND

With the development of an automatic control technology, a micro-sensor technology and a micro-electro-mechanical system, the multi-rotor unmanned aircraft having the advantages of stable performance and low cost, is replacing a traditional manned or unmanned helicopter and a fixed-wing aircraft gradually in many industries.

By carrying a camera or a professional imaging equipment and a sensor, the multi-rotor unmanned aircraft can conveniently complete various shooting tasks. For example, in a civilian field, the multi-rotor unmanned aircraft can be used for aerial photography of entertainment or movie or television, electric power line inspection, police patrol and so on; in a military field, the multi-rotor unmanned aircraft can be used for monitoring, investigation and so on.

At present, when the multi-rotor unmanned aircraft performs shooting tasks, in order to keep the shot object in the field of view of a shooting equipment, at least two operators are needed. One operator controls the flying of the unmanned aircraft, and the other operator controls the rotation of a pan-and-tilt. So that the two operators should be rich in experience, meanwhile, the two operators also should pay attention to the motion situation of the shot object in real time, which causing the shooting cost is high.

SUMMARY

The present disclosure relates to control system, terminal and airborne flight control system of multi-rotor aircraft, to realize automatic following of the aircraft.

In a first aspect, the present disclosure provides a control system of a multi-rotor aircraft, including an airborne flight control system and a smart terminal.

The airborne flight control system is configured to acquire a first position information, and send the first position information to the smart terminal, wherein the first position information is the position information of the aircraft where the airborne flight control system is located.

The smart terminal is configured to acquire a second position information, obtain a yaw angle and at least one of a horizontal flight speed and a vertical flight speed according to the second position information and the first position information sent by the airborne flight control system, and send the yaw angle and at least one of the horizontal flight speed and the vertical flight speed to the airborne flight control system, wherein the second position information is the position information of the smart terminal.

The airborne flight control system is further configured to control the aircraft where the airborne flight control system 11 is located to fly to the smart terminal, according to the yaw angle and at least one of the horizontal flight speed and the vertical flight speed.

In a second aspect, the present disclosure provides a smart terminal for controlling a multi-rotor aircraft, including: a positioning module, a control module and a transceiver.

The transceiver is configured to receive a first position information sent by an airborne flight control system of the controlled aircraft, wherein the first position information is the position information of the aircraft where the airborne flight control system is located.

The positioning module is configured to acquire a second position information, wherein the second position information is the position information of the smart terminal.

The control module is configured to obtain a yaw angle and at least one of a horizontal flight speed and a vertical flight speed according to the second position information and the first position information.

The transceiver is further configured to send the yaw angle and at least one of the horizontal flight speed and the vertical flight speed to the airborne flight control system, so that the airborne flight control system controls the aircraft where the airborne flight control system is located to fly to the smart terminal, according to the yaw angle and at least one of the horizontal flight speed and the vertical flight speed.

In a third aspect, the present disclosure provides an airborne flight control system, including: a positioning module, a processor and a transceiver.

The positioning module is configured to acquire a first position information, wherein the first position information is the position information of a aircraft where the airborne flight control system is located.

The transceiver is configured to send the first position information to a smart terminal, so that the smart terminal obtains a yaw angle and at least one of a horizontal flight speed and a vertical flight speed according to the first position information and a second position information, wherein the second position information is the position information of the smart terminal.

The transceiver is further configured to receive the yaw angle and at least one of the horizontal flight speed and the vertical flight speed.

The processor is configured to control the aircraft where the airborne flight control system is located to fly to the smart terminal, according to the yaw angle and at least one of the horizontal flight speed and the vertical flight speed.

The control system, the terminal and the airborne flight control system of the multi-rotor aircraft provided in the present disclosure, can obtain the yaw angle and at least one of the horizontal flight speed and the vertical flight speed through the smart terminal according to the position information of the aircraft and the smart terminal, and send the yaw angle and at least one of the horizontal flight speed and the vertical flight speed to the airborne flight control system. The airborne flight control system controls the aircraft where the airborne flight control system is located to fly to the smart terminal, according to the yaw angle and at least one of the horizontal flight speed and the vertical flight speed, so that automatic following of the aircraft is realized. Therefore, when the shot object carrying the smart terminal, the camera can be mounted on the aircraft and automatically follow the shot object to shoot, to avoid manually operating the aircraft. The shooting cost is saved, and the shooting efficiency is improved.

BRIEF DESCRIPTION OF THE DRAWINGS

In order to more clearly illustrate the embodiments of the present invention or the technical solutions in the prior art, the following drawings, which are intended to be used in the description of the embodiments or the prior art are briefly described. It will be apparent that the drawings are some embodiments of the present invention, and other drawings may be obtained by those skilled in the art without departing from the inventive work.

DETAILED DESCRIPTION

In order to make the purpose, technical scheme and advantages of the present invention more clearly, the following figures will be referenced to the embodiments of the present invention. The present invention will now be described, by way of example with reference to the accompanying drawings in which part of the embodiments, and not all embodiments. All other embodiments obtained by those of ordinary skill in the art without making creative work are within the scope of the present invention, based on embodiments in the present invention.

In the control system of the multi-rotor aircraft, the airborne flight control system has a positioning function. The smart terminal can be a somatosensory control device (e.g., a somatosensory controller), or a portable electronic device with communication, data processing and positioning functions (e.g., a smart phone or a portable computers). The positioning function of the airborne flight control system and the smart terminal can be realized by installing software with the positioning function (e.g., a global positioning system).

First Embodiment

Figure 1:
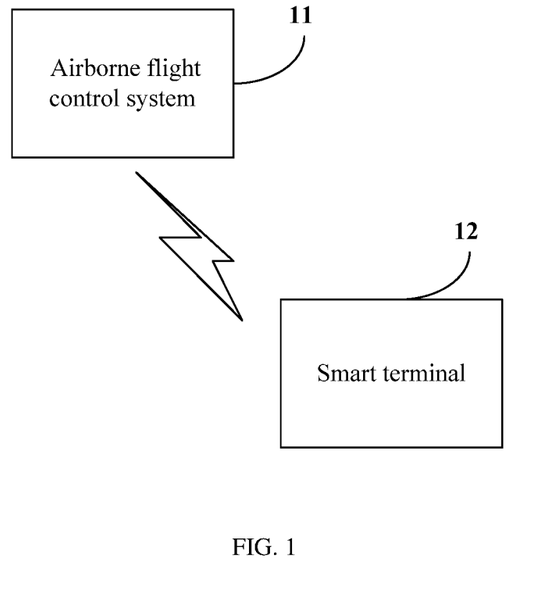
FIG. 1 illustrates a block diagram of a first embodiment of a control system of a multi-rotor aircraft.

Referring to FIG. 1, a block diagram of a first embodiment of a control system of a multi-rotor aircraft includes: an airborne flight control system 11 and a smart terminal 12.

The airborne flight control system 11 is configured to acquire a first position information, and sends the first position information to the smart terminal 12. Wherein, the first position information is the position information of an aircraft where the airborne flight control system 11 is located.

The smart terminal 12 is configured to acquire a second position information, and obtain a yaw angle and at least one of a horizontal flight speed and a vertical flight speed according to the second position information and the first position information sent by the airborne flight control system 11. The smart terminal 12 sends the yaw angle and at least one of the horizontal flight speed and the vertical flight speed to the airborne flight control system 11, wherein the second position information is the position information of the smart terminal 12. For example, application software (APP) of a mobile phone on the ground can obtain the position of the installed mobile phone through a sensor, such as a GPS sensor.

The airborne flight control system 11 is further configured to control the aircraft where the airborne flight control system 11 is located to fly to the smart terminal 12, according to the yaw angle and at least one of the horizontal flight speed and the vertical flight speed.

The smart terminal 12 can acquire the position information of the aircraft when the aircraft in which the airborne flight control system 11 is located flies, and acquire the position information of the aircraft from the airborne flight control system 11 when the aircraft not flies. Before acquiring the position information of the aircraft from the airborne flight control system 11, the smart terminal 12 firstly sends request information to the airborne flight control system 11, and then the airborne flight control system 11 replies the position information of the aircraft to the smart terminal 12 according to the request information. Alternatively, the airborne flight control system 11 also can send the position information of the aircraft to the smart terminal 12 in real time.

After acquiring the position information of the aircraft, the smart terminal 12 calculates which direction should the aircraft fly to (the yaw angle) according to the position information of the aircraft and the smart terminal 12. In the embodiment, the yaw angle calculated according to the position information of the aircraft and the smart terminal 12 ensures the aircraft always towards or directly faces the smart terminal 12 when flies. So that, after the smart terminal 12 sending the yaw angle to the airborne flight control system 11, the airborne flight control system 11 can control the aircraft to always fly towards or directly faces the smart terminal 12 according to the yaw angle.

In addition, after acquiring the position information of the aircraft, the smart terminal 12 calculates a flight speed of the aircraft according to the position information of the aircraft and the smart terminal 12, to ensure that the aircraft can follow the smart terminal 12 all the time.

For example, when a shot object carrying the smart terminal 12 moves in a horizontal direction, the smart terminal 12 calculates a horizontal flight speed corresponding to the aircraft according to the position information of the aircraft and the smart terminal 12, and sends the horizontal flight speed to the airborne flight control system 11. After receiving the horizontal flight speed, the airborne flight control system 11 controls the aircraft to fly at the horizontal flight speed, so that the aircraft can follow the shot object.

For example, when the shot object carrying the smart terminal 12 moves in a vertical direction (e.g., an umbrella jump), the smart terminal 12 calculates a vertical flight speed corresponding to the aircraft according to the position information of the aircraft and the smart terminal 12, and sends the vertical flight speed to the airborne flight control system 11. After receiving the vertical flight speed, the airborne flight control system 11 controls the aircraft to fly at the vertical flight speed, so that the aircraft can follow the shot object.

For example, when the shot object carrying the smart terminal 12 moves both in the horizontal direction and the vertical direction (e.g., a inclined upward or inclined downward movement), the smart terminal 12 calculates a horizontal flight speed and a vertical flight speed corresponding to the aircraft according to the position information of the aircraft and the smart terminal 12, and sends the horizontal flight speed and the vertical flight speed to the airborne flight control system 11. After receiving the horizontal flight speed and the vertical flight speed, the airborne flight control system 11 controls the aircraft to fly at the horizontal flight speed and the vertical flight speed, so that the aircraft can follow the shot object.

The situation that the aircraft following the shot object or the smart terminal can be referred as a following mode.

It can be seen that the control system of the multi-rotor aircraft can obtain the yaw angle and at least one of the horizontal flight speed and the vertical flight speed through the smart terminal according to the position information of the aircraft and the smart terminal, and send the yaw angle and at least one of the horizontal flight speed and the vertical flight speed to the airborne flight control system. The airborne flight control system controls the aircraft where the airborne flight control system is located to fly to the smart terminal, according to the yaw angle and at least one of the horizontal flight speed and the vertical flight speed, so that automatic following of the aircraft is realized. Therefore, when the shot object carrying the smart terminal, the camera can be mounted on the aircraft and automatically follow the shot object to shoot, to avoid manually operating the aircraft. The shooting cost is saved, and the shooting efficiency is improved.

The smart terminal above-mentioned also can automatically control a pan-and-tilt loading on the aircraft.

In detail, the smart terminal is further configured to generate a first pitch angle according to the first position information and the second position information, and send the first pitch to the airborne flight control system;

The airborne flight control system is further configured to control a pitch angle of the pan-and-tilt loading on the aircraft to be the first pitch angle.

The smart terminal can also semi-automatically control the pan-and-tilt loading on the aircraft.

In detail, the smart terminal is further configured to generate a second pitch angle according to a first control instruction, and send the second pitch to the airborne flight control system, wherein the first control instruction can be obtained according to information input or operated by an user on a software interface of the smart terminal;

The airborne flight control system is further configured to control a pitch angle of the pan-and-tilt loading on the aircraft to be the second pitch angle.

For example, after an user sliding a sliding bar of controlling the pitch angle of the pan-and-tilt on a mobile phone interface, the mobile phone generates an instruction for controlling the pitch angle of the pan-and-tilt according to the sliding of the user, and sends the instruction to the airborne flight control system. Then the airborne flight control system controls the pitch angle of the pan-and-tilt according to the instruction sent by the mobile phone.

The smart terminal can also semi-automatically control the flight of the aircraft.

In detail, the smart terminal is further configured to obtain at least one information of a flying height, a vertical flight speed and a destination according to a second control instruction, and send the at least one information to the airborne flight control system, wherein the acquisition of the second control instruction is similar to the acquisition mode of the first control instruction, and the description is not repeated herein;

The airborne flight control system is further configured to control at least one of the flying height, the vertical flight speed and the destination of the aircraft according to the at least one information.

Alternatively, for example, the smart terminal can be further configured to generate a take-off, hovering, landing or returning command according to a third control instruction, and send the commands to the airborne flight control system, wherein the acquisition of the third control instruction is similar to the acquisition mode of the first control instruction, and the description is not repeated herein.

The airborne flight control system is further configured to correspondingly control the aircraft to take off, hover, land or return according to the commands.

For example, the smart terminal is specifically configured to obtain the yaw angle through the following formula:

$$\psi = \operatorname{atan} \frac{Y_T - Y_F}{X_T - X_F}$$

Wherein $\psi$ is the yaw angle, $X_F$ and $Y_F$ are respectively a north axis and a east axis position of the aircraft in a NED (North-East-Down) coordinate system, $X_T$ and $Y_T$ are respectively a north axis and a east axis position of the smart terminal in the NED coordinate system.

For example, the smart terminal is specifically configured to obtain the horizontal flight speed through the following formula:

$$V_X = V\cos\psi,\ V_Y = V\sin\psi;$$

$$V = \begin{cases} V_m, & kD > V_m \\ kD, & V_m \geq kD \text{ and } D > d \\ 0, & d \geq D \geq 0 \end{cases}$$

$$D = \sqrt{(Y_T - Y_F)^2 + (X_T - X_F)^2}$$

$$\psi = \operatorname{atan} \frac{Y_T - Y_F}{X_T - X_F}$$

Wherein, $V_X$ is a flight speed of the aircraft in the north axis of the NED coordinate system indicated by the smart terminal, $V_Y$ is a flight speed of the aircraft in the east axis of the NED coordinate system indicated by the smart terminal, V is a down flight speed of the aircraft obtained by the smart terminal, $V_m$ is a maximum following speed of the aircraft obtained by the smart terminal, k is a gain coefficient, d is a dead zone radius, $\psi$ is the yaw angle, D is a distance between the aircraft and the smart terminal in the horizontal direction, $X_F$ and $Y_F$ are respectively the north axis and the east axis position of the aircraft in the NED coordinate system, $X_T$ and $Y_T$ are respectively the north axis and the east axis position of the smart terminal in the NED coordinate system.

For example, the smart terminal is specifically configured to obtain the vertical flight speed through the following formula:

$$V = \begin{cases} V_m, & kH > V_m \\ kH, & V_m \geq kH \text{ and } H > d \\ 0, & d \geq H \geq 0 \end{cases}$$

$$H = |Z_T - Z_F|$$

Wherein V is the vertical flight speed, $V_m$ is the maximum following speed of the aircraft obtained by the smart terminal, k is the gain coefficient, d is the dead zone radius, H is a distance between the aircraft and the smart terminal in the vertical direction, $Z_T$ and $Z_F$ are respectively the down axis position of the smart terminal and the aircraft in the NED coordinate system.

For example, the smart terminal is specifically configured to obtain the first pitch angle through the following formula:

$$\theta = \operatorname{atan}\frac{H}{D}$$

$$H = Z_T - Z_F$$

$$D = \sqrt{(Y_T - Y_F)^2 + (X_T - X_F)^2}$$

Wherein θ is the first pitch angle, H is the distance between the aircraft and the smart terminal in the vertical direction, $Z_T$ and $Z_F$ are respectively the down axis position of the smart terminal and the aircraft in the NED coordinate system, D is the distance between the aircraft and the smart terminal in the horizontal direction, $X_F$ and $Y_F$ are respectively the north axis and the east axis position of the aircraft in the NED coordinate system, $X_T$ and $Y_T$ are respectively the north axis and the east axis position of the smart terminal in the NED coordinate system.

The control system of the multi-rotor aircraft further comprises communication relay equipment, which is configured to increase the communication distance between the airborne flight control system and the smart terminal. For example, the control system of the multi-rotor aircraft performs signal relay through a Bluetooth communication box. The unmanned aircraft is in wireless communication with the Bluetooth communication box through a wireless data transmission module, the Bluetooth communication box and a smart mobile phone are in wireless communication through Bluetooth, so that reliable communication quality and speed can be guaranteed in the range of 1 km between the unmanned aircraft and the smart mobile phone. The invention is not limited to relaying by using the communication relay mode, and the communication relay mode is only an example for explanation the invention and is not limited.

It should be noted that the above "first" and "second" have no special meaning, just to distinguish between different modules.

Second Embodiment

The embodiment provides the smart terminal for controlling the multi-rotor aircraft. The smart terminal can be applied to any one of the above-mentioned control system of the multi-rotor aircraft provided by the first embodiment. The airborne flight control system in the embodiment can be any one of the above-mentioned airborne flight control system in the control system of the multi-rotor aircraft provided by the first embodiment.

Figure 2A:
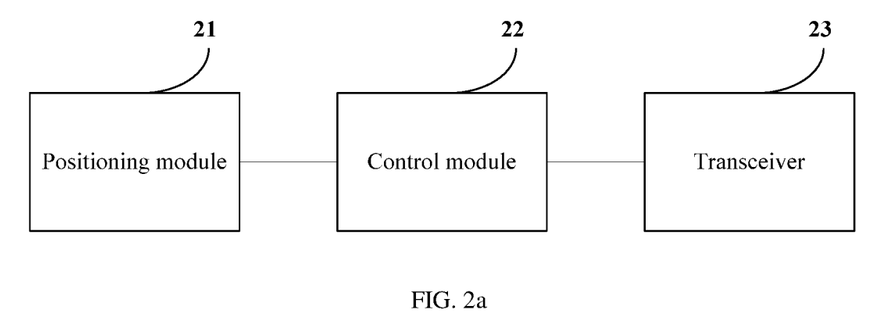
FIG. 2a illustrates a block diagram of a second embodiment of a smart terminal for controlling the multi-rotor aircraft.

Referring to FIG. 2a, a smart terminal for controlling the multi-rotor aircraft provided by the embodiment of the invention includes: a positioning module 21, a control module 22 and a transceiver 23.

The transceiver 23 is configured to receive a first position information sent by an airborne flight control system of the controlled aircraft, wherein the first position information is the position information of the aircraft where the airborne flight control system is located.

The positioning module 21 is configured to acquire a second position information, wherein the second position information is the position information of the smart terminal.

The control module 22 is configured to obtain a yaw angle and at least one of a horizontal flight speed and a vertical flight speed according to the second position information and the first position information.

The transceiver 23 is further configured to send the yaw angle and at least one of the horizontal flight speed and the vertical flight speed to the airborne flight control system, so that the airborne flight control system controls the aircraft where the airborne flight control system is located to fly to the smart terminal, according to the yaw angle and at least one of the horizontal flight speed and the vertical flight speed.

The control module 22 is further configured to generate a first pitch angle according to the first position information and the second position information.

The transceiver 23 is further configured to send the first pitch angle to the airborne flight control system, so that the airborne flight control system controls a pitch angle of the pan-and-tilt loading on the aircraft to be the first pitch angle.

The terminal further includes an interface interaction module. The interface interaction module is configured to receive a first control instruction.

Correspondingly, the control module 22 is further configured to generate a second pitch angle according to the first control instruction.

The transceiver 23 is further configured to send the second pitch angle to the airborne flight control system, so that the airborne flight control system controls a pitch angle of the pan-and-tilt loading on the aircraft to be the second pitch angle.

The interface interaction module is further configured to receive a second control instruction;

The control module 22 is further configured to obtain at least one information of a flying height, a vertical flight speed and a destination according to the second control instruction;

The transceiver 23 is further configured to send the at least one information to the airborne flight control system, so that the airborne flight control system correspondingly controls at least one of the flying height, the vertical flight speed and the destination of the aircraft according to the at least one information.

The interface interaction module is further configured to receive a third control instruction;

The control module 22 is further configured to generate a take-off, hovering, landing or returning command according to the third control instruction;

The transceiver 23 is further configured to send the commands to the airborne flight control system, so that the airborne flight control system correspondingly controls the aircraft to take off, hover, land or return according to the commands.

For example, the control module 22 is specifically configured to obtain the yaw angle through the following formula:

$$\psi = \operatorname{atan}\frac{Y_T - Y_F}{X_T - X_F}$$

Wherein ψ is the yaw angle, $X_F$ and $Y_F$ are respectively a north axis and a east axis position of the aircraft in a NED (North East Down) coordinate system, $X_T$ and $Y_T$ are respectively a north axis and a east axis position of the smart terminal in the NED coordinate system.

For example, the control module 22 is specifically configured to obtain the horizontal flight speed through the following formula:

$$V_X = V\cos\psi, V_Y = V\sin\psi;$$

$$V = \begin{cases} V_m, & kD > V_m \\ kD, & V_m \geq kD \text{ and } D > d \\ 0, & d \geq D \geq 0 \end{cases}$$

$$D = \sqrt{(Y_T - Y_F)^2 + (X_T - X_F)^2}$$

$$\psi = \operatorname{atan}\frac{Y_T - Y_F}{X_T - X_F}$$

Wherein, $V_X$ is a flight speed of the aircraft in the north axis of the NED coordinate system indicated by the smart terminal, $V_Y$ is a flight speed of the aircraft in the east axis of the NED coordinate system indicated by the smart terminal, V is a down flight speed of the aircraft obtained by the smart terminal, $V_m$ is a maximum following speed of the aircraft obtained by the smart terminal, k is a gain coefficient, d is a dead zone radius, $\psi$ is the yaw angle, D is a distance between the aircraft and the smart terminal in the horizontal direction, $X_F$ and $Y_F$ are respectively the north axis and the east axis position of the aircraft in the NED coordinate system, $X_T$ and $Y_T$ are respectively the north axis and the east axis position of the smart terminal in the NED coordinate system.

For example, the control module 22 is specifically configured to obtain the vertical flight speed through the following formula:

$$V = \begin{cases} V_m, & kH > V_m \\ kH, & V_m \geq kH \text{ and } H > d \\ 0, & d \geq H \geq 0 \end{cases}$$

$$H = |Z_T - Z_F|$$

Wherein V is the vertical flight speed, $V_m$ is the maximum following speed of the aircraft obtained by the smart terminal, k is the gain coefficient, d is the dead zone radius, H is a distance between the aircraft and the smart terminal in the vertical direction, $Z_T$ and $Z_F$ are respectively the down axis position of the smart terminal and the aircraft in the NED coordinate system.

For example, the control module 22 is specifically configured to obtain the first pitch angle through the following formula:

$$\theta = \operatorname{atan}\frac{H}{D}$$

$$H = Z_T - Z_F$$

$$D = \sqrt{(Y_T - Y_F)^2 + (X_T - X_F)^2}$$

Wherein $\theta$ is the first pitch angle, H is the distance between the aircraft and the smart terminal in the vertical direction, $Z_T$ and $Z_F$ are respectively the down axis position of the smart terminal and the aircraft in the NED coordinate system, D is the distance between the aircraft and the smart terminal in the horizontal direction, $X_F$ and $Y_F$ are respectively the north axis and the east axis position of the aircraft in the NED coordinate system, $X_T$ and $Y_T$ are respectively the north axis and the east axis position of the smart terminal in the NED coordinate system.

The transceiver 23 is further configured to communicate with the airborne flight control system through communication relay equipment.

Figure 2B:
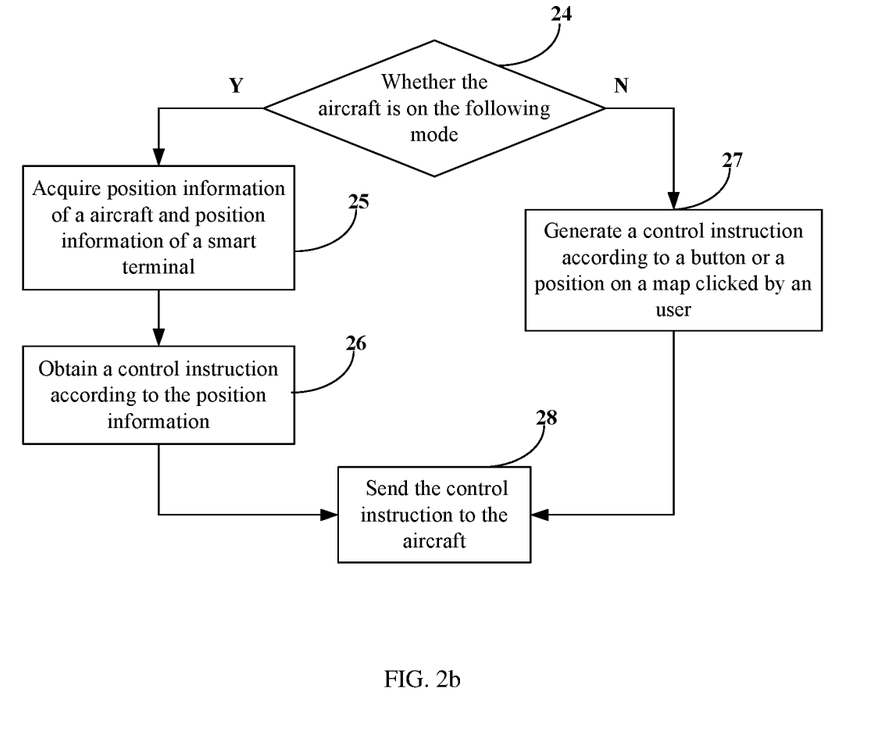
FIG. 2b illustrates a flowchart of a method for controlling the multi-rotor aircraft by the smart terminal.

Referring to FIG. 2b, a control method of the smart terminal for controlling the aircraft includes: step 24 to step 28.

In step 24, the smart terminal determines whether the aircraft is on the following mode. If the aircraft is on the following mode, step 25 is executed; otherwise, step 27 is executed.

In step 25, the smart terminal acquires position information of the aircraft and position information of the smart terminal.

In step 26, the smart terminal obtains a control instruction according to the position information of the aircraft and the position information of the smart terminal. For example, the smart terminal can compare a position deviation between the smart terminal and the aircraft, to obtain a flight speed, a flight direction and a yaw command of the aircraft, so that the aircraft is controlled to fly to a position of an user carrying the smart terminal, and a camera of the aircraft is aligned to the user. Then, step 28 is executed.

In step 27, the smart terminal generates a control instruction according to a button or a position on a map clicked by the user. For example, when the aircraft is on a normal mode (i.e., a mode except the following mode), the smart terminal can control the aircraft to unlock, take off, land or fly to a designated point through an APP. In this way, the user can one-key control the unmanned aircraft to take-off, hover, land or return by clicking the button on the APP interface on the smart terminal, and control the unmanned aircraft to fly to the designated point by clicking the point on the map displayed on the APP. The implementation mode is that when the user operates the smart terminal, the smart terminal sends corresponding instruction to the unmanned aircraft, and the airborne flight control system completes corresponding task which is indicated by the user operation.

In step 28, the smart terminal sends the control instruction to the aircraft. The airborne flight control system on the aircraft controls the aircraft to fly along with the smart terminal according to the control instruction.

In this way, when the aircraft is on the following mode, the user does not need any operation, and the APP automatically obtains the control instruction according to GPS information of the smart terminal and the position information from the unmanned aircraft, and sends the control instruction to the unmanned aircraft in real time.

The following embodiment is an example of controlling the unmanned aircraft to automatically follow a mobile phone, to explain a method of the smart terminal for obtaining the yaw angle and the flight speed according to the position information.

Figure 2C:
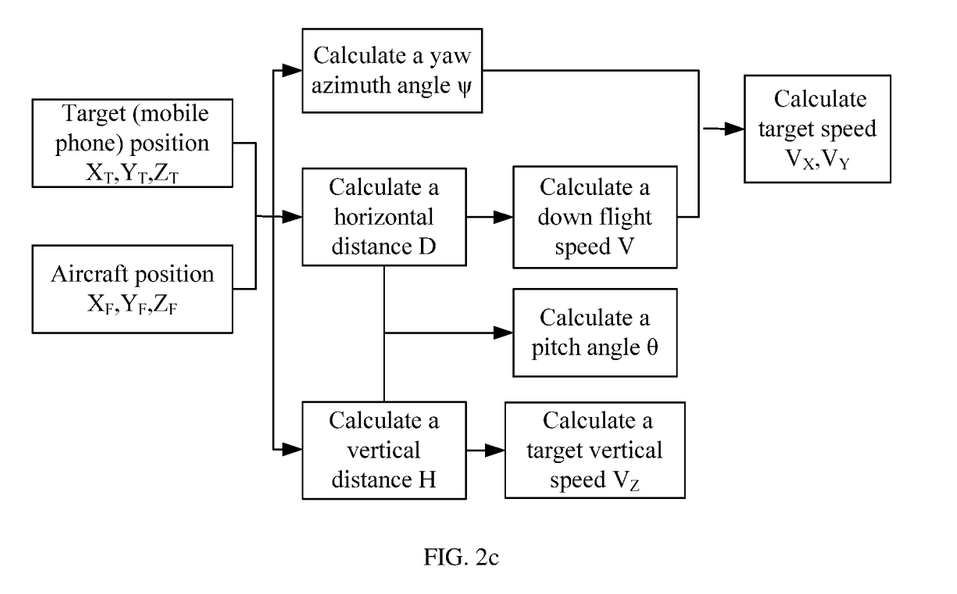
FIG. 2c illustrates a schematic diagram of acquiring a control instruction according to a position information by the smart terminal.

Referring to FIG. 2c, the unmanned aircraft and the mobile phone both define their positions by the NED coordinate system. For example, the positions of the aircraft in the space are defined as $X_F$, $Y_F$ and $Z_F$, and the positions of a following target (i.e., the mobile phone) in the space are defined as $X_T$, $Y_T$ and $Z_T$. The position information can be read from the airborne flight control system and the APP in the mobile phone.

The APP installed on the mobile phone can calculate a yaw azimuth angle of the following target in the horizontal direction relative to the unmanned aircraft:

$$\psi = \operatorname{atan}\frac{Y_T - Y_F}{X_T - X_F},$$

and set the yaw azimuth angle as a target yaw angle of the unmanned aircraft, so that the unmanned aircraft directly faces the following target.

A distance between the unmanned aircraft and the following target in the horizontal direction is:

$$D=\sqrt{(Y_T-Y_F)^2+(X_T-X_F)^2},$$

and a distance between the aircraft and the following target in the vertical direction is:

$$H=Z_T-Z_F.$$

The APP installed on the mobile phone can calculate a target down flight speed of the unmanned aircraft:

$$V = \begin{cases} V_m, kD > V_m \\ kD, V_m \geq kD \text{ and } D > d \\ 0, d \geq D \geq 0 \end{cases}$$

Wherein $V_m$ is the maximum following speed, k is the gain coefficient, and d is the dead zone radius. When the distance between the aircraft and the target is smaller than the d, it is considered that the target has been followed without further position adjusting.

On the basis, a target speed in the X direction and the Y direction of the aircraft can be calculated: $V_X=V \cos \psi$, $V_Y=V \sin \psi$.

A target speed in the height direction of the aircraft is obtained through the distance H in the vertical direction. The method for obtaining the target speed in the height direction is similar to the method for obtaining the target speed in the horizontal direction.

Then, the mobile phone sends the target yaw angle, the target horizontal speed and the target vertical speed to the airborne flight control system. Through controlling the yaw angle and the speed of the unmanned aircraft to be the target yaw angle, the target horizontal speed and the target vertical speed by the airborne flight control system on the unmanned aircraft, the unmanned aircraft realizes flying following the following target and shooting equipment carried on the unmanned aircraft can following shooting the following target.

In practical application, when the following target moves on the ground, the unmanned aircraft can fly at a fixed height, and the fixed height can be specified by an user instead of an algorithm, so that the target vertical speed $V_Z$ of the aircraft can also be set by an user through operating a sliding strip on the APP interface.

In general, the aircraft flies above the following target, the pan-and-tilt should shoot under a low head, so that the target pitch angle of the pan-and-tilt controlled by the mobile phone is:

$$\theta = \operatorname{atan}\frac{H}{D}.$$

In practical application, a roll angle of the pan-and-tilt can be adjusted through the APP, but generally set as 0. The pitch angle of the pan-and-tilt can be automatically adjusted. However, the user does not need the target to be in the center of the shooting visual field in the application., but can be shot at a fixed viewing angle. Therefore, in the control system of the multi-rotor aircraft provided by the embodiment of the invention, the pitch angle of the pan-and-tilt an also be manually adjusted through the APP.

Third Embodiment

The embodiment provides an airborne flight control system. The airborne flight control system can be applied to any one of the control systems of the multi-rotor aircraft provided by the above embodiments. The smart terminal involved in the embodiment can be any smart terminal provided by the above embodiments.

Figure 3:
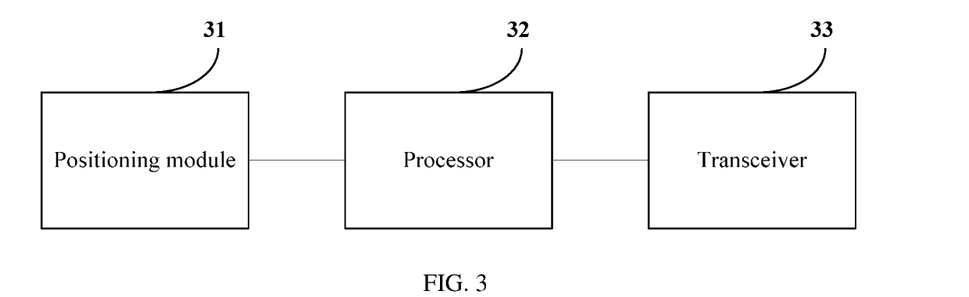
FIG. 3 illustrates a block diagram of a third embodiment of an airborne flight control system.

Referring to FIG. 3, the airborne flight control system provided by the embodiment includes: a positioning module 31, a processor 32 and a transceiver 33.

The positioning module 31 is configured to acquire a first position information, wherein the first position information is the position information of the aircraft where the airborne flight control system is located.

The transceiver 33 is configured to send the first position information to the smart terminal, so that the smart terminal obtains a yaw angle and at least one of a horizontal flight speed and a vertical flight speed according to the first position information and the second position information, wherein the second position information is the position information of the smart terminal.

The transceiver 33 is further configured to receive the yaw angle and at least one of the horizontal flight speed and the vertical flight speed.

The processor 32 is configured to control the aircraft where the airborne flight control system is located to fly to the smart terminal, according to the yaw angle and at least one of the horizontal flight speed and the vertical flight speed.

The transceiver 33 is further configured to receive at least one of a first pitch angle and a second pitch angle of the smart terminal.

Correspondingly, the processor 32 is further configured to control a pitch angle of the pan-and-tilt loading on the aircraft according to the at least one pitch angle information.

The transceiver 33 is further configured to receive at least one information of a flying height, a vertical flight speed and a destination sent from the smart terminal;

The processor 32 is further configured to control the flight of the aircraft according to the at least one information.

The transceiver 33 is further configured to receive a take-off, hovering, landing or returning command sent from the smart terminal;

Correspondingly, the processor 32 is further configured to control the aircraft to take off, hover, land or return according to the commands.

The transceiver 33 is further configured to communicate with the smart terminal through communication relay equipment.

Forth Embodiment

The embodiment of the invention provides another control system of the multi-rotor aircraft. In the embodiment, the communication relay equipment is a Bluetooth communication box, and the smart terminal is a smart mobile phone. The control system of the multi-rotor aircraft is arranged in an unmanned aircraft, and a pan-and-tilt 44 and shooting equipment 45 are carried on the unmanned aircraft (referring to FIG. 4). Wherein the shooting equipment 45 is fixed on the pan-and-tilt 44, the pan-and-tilt 44 is fixed on the unmanned aircraft. The yaw angle of the pan-and-tilt 44 is consistent with that of the unmanned a aircraft.

Figure 4:
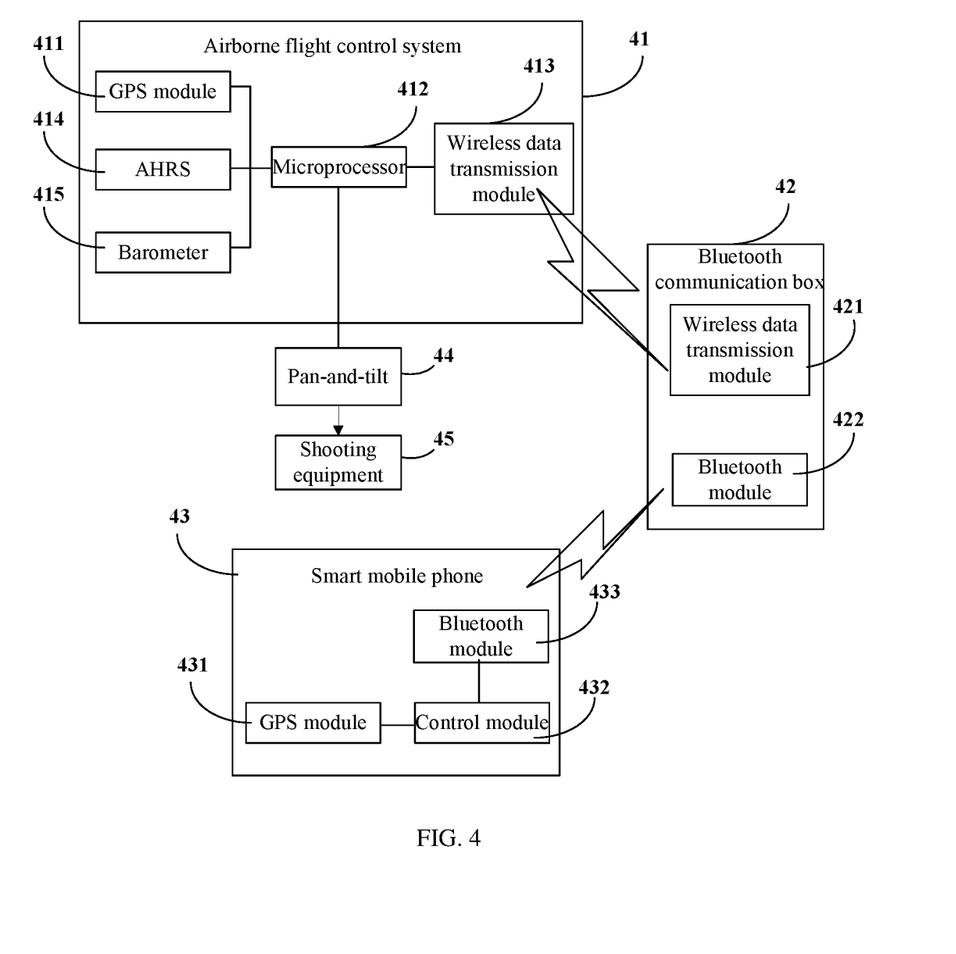
FIG. 4 illustrates an application schematic diagram of a forth embodiment of the control system of the multi-rotor aircraft.

Referring to FIG. 4, the control system of the multi-rotor aircraft provided by the embodiment of the invention includes: an airborne flight control system 41, a Bluetooth communication box 42 and a smart mobile phone 43.

The airborne flight control System 41 includes: a first GPS module 411, a microprocessor 412, a wireless data transmission module 413, an attitude heading reference system (AHRS) 414 and a barometer 415.

The microprocessor 411 can operate correlation algorithm for a single-chip microcomputer, and acquire an attitude and position through the GPS module 411, the AHRS 414 and the barometer 415, to control the flight of the aircraft in which the airborne flight control system 41 is located, such as controlling the attitude and position of the multi-rotor unmanned aircraft and completing autonomous hovering or cruising flying.

The microprocessor 411 can also perform bidirectional data communication with the smart mobile phone 43 through the wireless data transmission module 413, to obtain a control instruction sent by the smart mobile phone 43. The control instructions which can be received by the airborne flight control system 41 include, but are not limited to: the target position in the horizontal direction and the vertical direction, the target speed in the horizontal direction and the vertical direction, the target yaw angle of the aircraft and so on. The airborne flight control system 41 can also control the attitude and position of the unmanned aircraft according to the received control instructions.

According to the received control instructions, the airborne flight control system 41 can also output PWM (pulse width modulation) signals to control the pitch and/or rolling angle of the pan-and-tilt 44, that is, controlling at least one of the pitch angle and the roll angle of the pan-and-tilt 44, so as to control the shooting visual field of the shooting equipment 45 fixed on the pan-and-tilt 44.

The Bluetooth communication box 42 includes a wireless data transmission module 421 and a Bluetooth module 422. The Bluetooth communication box 42 is in communication with the airborne flight control system 41 through the wireless data transmission module 421, and is communicated with the smart mobile phone 43 through the Bluetooth module 422. The Bluetooth communication box 42 is as a relay to transmit data between the airborne flight control system 41 and the smart mobile phone 43, to establish a stable and long-distance communication link between the unmanned aircraft and the smart mobile phone 43.

The smart mobile phone 43 includes: a GPS module 431, a control module 432 and a Bluetooth module 433.

The control module 432 can be an app installed on the smart mobile phone 43. When the APP runs, GPS positioning information of the smart mobile phone 43 can be acquired through the GPS module, and data communication with the unmanned aircraft is carried out through the Bluetooth module 433. According to the position information of the unmanned aircraft sent by the airborne flight control system 41 and the position information of the smart mobile phone 43, the APP can obtain the yaw angle and the flight speed through running following flying algorithm, and send the yaw angle and the flight speed to the airborne flight control system 41 to control the flight and shooting of the unmanned aircraft.

The technical schemes provided by the embodiments can use the GPS on the multi-rotor unmanned aircraft and the GPS on the smart mobile phone carried by the shooting object, that is, use the positioning information obtained by the GPS, to realize the unmanned aircraft fully automatically flying following the shot object, and automatically aiming at the shot object to shoot. Any user wanting to shoot does not need to be trained, the user can carry the smart mobile phone and operate the APP on the phone, to make the unmanned aircraft automatically fly following the user and aim at the user to shoot, or can put the smart mobile phone on other object, to make the unmanned aircraft automatically fly following the object and shoot.

Through the flight control system of the multi-rotor unmanned aircraft cooperating with the smart mobile phone running the corresponding APP, the invention realize that the unmanned aircraft automatically fly along with the user carrying the smart mobile phone, and make the camera aim at the area where the user is located. When the user carries the smart mobile phone, the unmanned aircraft can automatically follow and shoot the user in real-time; when the smart mobile phone is put on a vehicle, a ship and other place, the unmanned aircraft can automatically follow cruising and shoot too. This invention can be widely applied to the fields of entertainment, aerial photography, extreme motion, monitoring, investigation and so on.

What is claimed is:

1. A control system of a multi-rotor aircraft, comprising:
an airborne flight control system and a smart terminal; wherein
the airborne flight control system is configured to acquire a first position information, and send the first position information to the smart terminal, wherein the first position information is the position information of the multi-rotor aircraft where the airborne flight control system is located;
the smart terminal is configured to acquire a second position information, generate a yaw angle which ensures that the multi-rotor aircraft always towards or directly faces the smart terminal when the multi-rotor aircraft flies and at least one of a horizontal flight speed and a vertical flight speed which ensures that the multi-rotor aircraft follows the smart terminal all the time according to the second position information and the first position information sent by the airborne flight control system, and send the yaw angle and at least one of the horizontal flight speed and the vertical flight speed to the airborne flight control system, wherein the second position information is the position information of the smart terminal;
the smart terminal is configured to generate the yaw angle through the following formula:

$$\psi = \operatorname{atan}\frac{Y_T - Y_F}{X_T - X_F},$$

wherein, $\psi$ is the yaw angle, $X_F$ and $Y_F$ are respectively a north axis and an east axis position of the multi-rotor aircraft in a North-East-Down (NED) coordinate system, $X_T$ and $Y_T$ are respectively a north axis and an east axis position of the smart terminal in the NED coordinate system;
the smart terminal is configured to generate the horizontal flight speed through the following formula:

$$V_X = V\cos\psi, V_Y = V\sin\psi,$$

$$V = \begin{cases} V_m, kD > V_m \\ kD, V_m \geq kD \text{ and } D > d \\ 0, d \geq D \geq 0 \end{cases},$$

-continued $$D = \sqrt{(Y_T - Y_F)^2 + (X_T - X_F)^2},$$

$$\psi = \operatorname{atan}\frac{Y_T - Y_F}{X_T - X_F},$$

wherein, $V_X$ is a flight speed of the multi-rotor aircraft in the north axis of the NED coordinate system indicated by the smart terminal, $V_Y$ is a flight speed of the multi-rotor aircraft in the east axis of the NED coordinate system indicated by the smart terminal, V is a down flight speed of the multi-rotor aircraft obtained by the smart terminal, $V_m$ is a maximum following speed of the multi-rotor aircraft obtained by the smart terminal, k is a gain coefficient, d is a dead zone radius, $\psi$ is the yaw angle, D is a distance between the multi-rotor aircraft and the smart terminal in the horizontal direction;

the airborne flight control system is further configured to control the multi-rotor aircraft where the airborne flight control system is located to fly to the smart terminal, according to the yaw angle and at least one of the horizontal flight speed and the vertical flight speed.

2. The control system as claimed in claim 1, wherein:
the smart terminal is further configured to generate a first pitch angle according to the first position information and the second position information, and send the first pitch to the airborne flight control system;
the airborne flight control system is further configured to control a pitch angle of a pan-and-tilt loading on the multi-rotor aircraft to be the first pitch angle.

3. The control system as claimed in claim 1, wherein:
the smart terminal is further configured to generate a second pitch angle according to a first control instruction, and send the second pitch to the airborne flight control system;
the airborne flight control system is further configured to control a pitch angle of the pan-and-tilt loading on the multi-rotor aircraft to be the second pitch angle.

4. The control system as claimed in claim 1, wherein:
the smart terminal is further configured to generate at least one information of a flying height, a vertical flight speed and a destination according to a second control instruction, and send the at least one information to the airborne flight control system;
the airborne flight control system is further configured to control at least one of the flying height, the vertical flight speed and the destination of the multi-rotor aircraft according to the at least one information.

5. The control system as claimed in claim 1, wherein:
the smart terminal is further configured to generate a take-off, hovering, landing or returning command according to a third control instruction, and send the command to the airborne flight control system;
the airborne flight control system is further configured to correspondingly control the multi-rotor aircraft to take off, hover, land or return according to the command.

6. The control system as claimed in claim 1, wherein the system further comprises a communication relay equipment, which is configured to increase a communication distance between the airborne flight control system and the smart terminal.

7. A smart terminal for controlling a multi-rotor aircraft, comprising:
a positioning module, a control module and a transceiver; wherein the transceiver is configured to receive a first position information sent by an airborne flight control system of the controlled multi-rotor aircraft, wherein the first position information is the position information of the multi-rotor aircraft where the airborne flight control system is located;
the positioning module is configured to acquire a second position information, wherein the second position information is the position information of the smart terminal;
the control module is configured to generate a yaw angle which ensures that the multi-rotor aircraft always towards or directly faces the smart terminal when the multi-rotor aircraft flies and at least one of a horizontal flight speed and a vertical flight speed which ensures that the multi-rotor aircraft follows the smart terminal all the time according to the second position information and the first position information;
wherein the control module is configured to generate the yaw angle through the following formula:

$$\psi = a\tan\frac{Y_T - Y_F}{X_T - X_F},$$

wherein, $\psi$ is the yaw angle, $X_F$ and $Y_F$ are respectively a north axis and an east axis position of the multi-rotor aircraft in a North-East-Down (NED) coordinate system, $X_T$ and $Y_T$ are respectively a north axis and an east axis position of the smart terminal in the NED coordinate system;
the control module is configured to generate the horizontal flight speed through the following formula:

$$V_X = V\cos\psi, \; V_Y = V\sin\psi,$$

$$V = \begin{cases} V_m, & kD > V_m \\ kD, & V_m \geq kD \text{ and } D > d, \\ 0, & d \geq D \geq 0 \end{cases}$$

$$D = \sqrt{(Y_T - Y_F)^2 + (X_T - X_F)^2},$$

$$\psi = a\tan\frac{Y_T - Y_F}{X_T - X_F},$$

wherein, $V_X$ is a flight speed of the multi-rotor aircraft in the north axis of the NED coordinate system indicated by the smart terminal, $V_Y$ is a flight speed of the multi-rotor aircraft in the east axis of the NED coordinate system indicated by the smart terminal, V is a down flight speed of the multi-rotor aircraft obtained by the smart terminal, $V_m$ is a maximum following speed of the multi-rotor aircraft obtained by the smart terminal, k is a gain coefficient, d is a dead zone radius, $\psi$ is the yaw angle, D is a distance between the multi-rotor aircraft and the smart terminal in the horizontal direction;
the transceiver is further configured to send the yaw angle and at least one of the horizontal flight speed and the vertical flight speed to the airborne flight control system, so that the airborne flight control system controls the multi-rotor aircraft where the airborne flight control system is located to fly to the smart terminal, according to the yaw angle and at least one of the horizontal flight speed and the vertical flight speed.

8. The smart terminal as claimed in claim 7, wherein:
the control module is further configured to generate a first pitch angle according to the first position information and the second position information;
the transceiver is further configured to send the first pitch angle to the airborne flight control system, so that the airborne flight control system controls a pitch angle of a pan-and-tilt loading on the multi-rotor aircraft to be the first pitch angle.

9. The smart terminal as claimed in claim 8, wherein the control module is configured to obtain the first pitch angle through the following formula:

$$\theta = \operatorname{atan}\frac{H}{D},$$
$$H = Z_T - Z_F,$$
$$D = \sqrt{(Y_T - Y_F)^2 + (X_T - X_F)^2},$$

wherein, $\theta$ is the first pitch angle, H is the distance between the multi-rotor aircraft and the smart terminal in the vertical direction, $Z_T$ and $Z_F$ are respectively the down axis position of the smart terminal and the multi-rotor aircraft in the NED coordinate system, D is the distance between the multi-rotor aircraft and the smart terminal in the horizontal direction.

10. The smart terminal as claimed in claim 7, wherein:
the terminal further includes an interface interaction module;
the interface interaction module is configured to receive a first control instruction;
the control module is further configured to generate a second pitch angle according to the first control instruction;
the transceiver is further configured to send the second pitch angle to the airborne flight control system, so that the airborne flight control system controls a pitch angle of the pan-and-tilt loading on the multi-rotor aircraft to be the second pitch angle.

11. The smart terminal as claimed in claim 10, wherein:
the interface interaction module is further configured to receive a second control instruction;
the control module is further configured to generate at least one information of a flying height, a vertical flight speed and a destination according to the second control instruction;
the transceiver is further configured to send the at least one information to the airborne flight control system, so that the airborne flight control system correspondingly controls at least one of the flying height, the vertical flight speed and the destination of the multi-rotor aircraft according to the at least one information.

12. The smart terminal as claimed in claim 10, wherein:
the interface interaction module is further configured to receive a third control instruction;
the control module is further configured to generate a take-off, hovering, landing or returning command according to the third control instruction;
the transceiver is further configured to send the command to the airborne flight control system, so that the airborne flight control system correspondingly controls the multi-rotor aircraft to take off, hover, land or return according to the command.

13. The smart terminal as claimed in claim 7, wherein the control module is configured to generate the vertical flight speed through the following formula:

$$V = \begin{cases} V_m, & kH > V_m \\ kH, & V_m \geq kH \text{ and } H > d \\ 0, & d \geq H \geq 0 \end{cases}$$
$$H = |Z_T - Z_F|,$$

wherein, V is the vertical flight speed, $V_m$ is the maximum following speed of the multi-rotor aircraft obtained by the smart terminal, k is the gain coefficient, d is the dead zone radius, H is a distance between the multi-rotor aircraft and the smart terminal in the vertical direction, $Z_T$ and $Z_F$ are respectively the down axis position of the smart terminal and the multi-rotor aircraft in a North the NED coordinate system.

14. An airborne flight control system, comprising:
a positioning module, a processor and a transceiver; wherein
the positioning module is configured to acquire a first position information, wherein the first position information is the position information of a multi-rotor aircraft where the airborne flight control system is located;
the transceiver is configured to send the first position information to a smart terminal, so that the smart terminal generates a yaw angle which ensures that the multi-rotor aircraft always towards or directly faces the smart terminal when the multi-rotor aircraft flies and at least one of a horizontal flight speed and a vertical flight speed which ensures that the multi-rotor aircraft follows the smart terminal all the time according to the first position information and a second position information, wherein the second position information is the position information of the smart terminal;
wherein the smart terminal is configured to generate the yaw angle through the following formula:

$$\psi = \operatorname{atan}\frac{Y_T - Y_F}{X_T - X_F},$$

wherein, $\psi$ is the yaw angle, $X_F$ and $Y_F$ are respectively a north axis and an east axis position of the multi-rotor aircraft in a North-East-Down (NED) coordinate system, $X_T$ and $Y_T$ are respectively a north axis and an east axis position of the smart terminal in the NED coordinate system;
the smart terminal is configured to generate the horizontal flight speed through the following formula:

$$V_X = V\cos\psi, \; V_Y = V\sin\psi,$$
$$V = \begin{cases} V_m, & kD > V_m \\ kD, & V_m \geq kD \text{ and } D > d \\ 0, & d \geq D \geq 0 \end{cases}$$
$$D = \sqrt{(Y_T - Y_F)^2 + (X_T - X_F)^2},$$
$$\psi = \operatorname{atan}\frac{Y_T - Y_F}{X_T - X_F},$$

wherein, $V_X$ is a flight speed of the multi-rotor aircraft in the north axis of the NED coordinate system indicated by the smart terminal, $V_Y$ is a flight speed of the multi-rotor aircraft in the east axis of the NED coordinate system indicated by the smart terminal, V is a down flight speed of the multi-rotor aircraft obtained by the smart terminal, $V_m$ is a maximum following speed of the multi-rotor aircraft obtained by the smart terminal, k is a gain coefficient, d is a dead zone radius, $\psi$ is the yaw angle, D is a distance between the multi-rotor aircraft and the smart terminal in the horizontal direction;

the transceiver is further configured to receive the yaw angle and at least one of the horizontal flight speed and the vertical flight speed;

the processor is configured to control the multi-rotor aircraft where the airborne flight control system is located to fly to the smart terminal, according to the yaw angle and at least one of the horizontal flight speed and the vertical flight speed.

15. The airborne flight control system as claimed in claim 14, wherein:

the transceiver is further configured to receive at least one of a first pitch angle and a second pitch angle of the smart terminal;

the processor is further configured to control a pitch angle of a pan-and-tilt loading on the multi-rotor aircraft according to the at least one pitch angle information.

16. The airborne flight control system as claimed in claim 14, wherein:

the transceiver is further configured to receive at least one information of a flying height, a vertical flight speed and a destination sent from the smart terminal;

the processor is further configured to control the flight of the multi-rotor aircraft according to the at least one information.

17. The airborne flight control system as claimed in claim 14, wherein:

the transceiver is further configured to receive a take-off, hovering, landing or returning command sent from the smart terminal;

the processor is further configured to control the multi-rotor aircraft to take off, hover, land or return according to the command.

18. The airborne flight control system as claimed in claim 14, wherein transceiver is further configured to communicate with the smart terminal through communication relay equipment.

* * * * *